United States Patent
Guzik et al.

(10) Patent No.: US 6,785,085 B2
(45) Date of Patent: Aug. 31, 2004

(54) MULTI-FREQUENCY SERVO BURSTS IN MAGNETIC DISC MEMORY SYSTEM

(75) Inventors: Nahum Guzik, Palo Alto, CA (US); Anatoli B. Stein, Los Altos, CA (US); Alex Talalai, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 210 days.

(21) Appl. No.: 10/021,444

(22) Filed: Oct. 30, 2001

(65) Prior Publication Data

US 2002/0114101 A1 Aug. 22, 2002

Related U.S. Application Data

(60) Provisional application No. 60/244,551, filed on Oct. 31, 2000, and provisional application No. 60/258,082, filed on Dec. 22, 2000.

(51) Int. Cl.$^7$ .................................................. G11B 5/596
(52) U.S. Cl. .................................................. 360/77.08
(58) Field of Search ........................... 360/77.08, 77.01, 360/77.05, 51, 46

(56) References Cited

U.S. PATENT DOCUMENTS

| | | | |
|---|---|---|---|
| 5,128,809 A | * 7/1992 | Leis et al. | 360/51 |
| 5,442,498 A | * 8/1995 | Cheung et al. | 360/77.08 |
| 5,453,887 A | * 9/1995 | Negishi et al. | 360/77.01 |
| 5,966,264 A | * 10/1999 | Belser et al. | 360/77.08 |
| 6,025,970 A | * 2/2000 | Cheung | 360/77.08 |
| 6,034,835 A | * 3/2000 | Serrano | 360/77.05 |
| 6,078,445 A | * 6/2000 | Serrano et al. | 360/46 |

* cited by examiner

*Primary Examiner*—David Hudspeth
*Assistant Examiner*—Fred F. Tzeng
(74) *Attorney, Agent, or Firm*—McDermott, Will & Emery LLP (57) ABSTRACT

A servo burst pattern for use in positioning a read/write head with respect to tracks on a magnetic disc medium includes a first set of servo bursts adjacently disposed on the tracks along a first axis perpendicular to the centerlines. Each of the first set of bursts is disposed on an individual track, from the inside track edge to the outside track edge, and alternates between a first frequency and a second frequency for consecutive servo bursts. The servo burst pattern also includes a second set of servo bursts adjacently disposed on the tracks along a second axis perpendicular to the centerlines and parallel to the first axis. Each of the second set of servo bursts is disposed on two adjacent tracks, from the centerline of one track to the centerline of a next adjacent track, and alternates between the first frequency and the second frequency for consecutive servo bursts.

44 Claims, 8 Drawing Sheets

MULTI-FREQUENCY SERVO BURSTS IN MAGNETIC DISC MEMORY SYSTEM

CROSS-REFERENCE TO RELATED APPLICATIONS

This application claims the benefit of U.S. Provisional Application No. 60/258,082 entitled "MULTI-FREQUENCY SERVO BURSTS IN MAGNETIC DISC MEMORY SYSTEMS" filed on Dec. 22, 2000 and U.S. Provisional Application No. 60/244,551 entitled "MULTI-FREQUENCY SERVO BURSTS IN MAGNETIC DISC MEMORY SYSTEMS", filed on Oct. 31, 2000, the disclosure of which is entirely incorporated herein by reference.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to disc memory systems, and more particularly, to positioning information on magnetic disc media for positioning read/write heads.

During normal operation, most computer systems typically require high-capacity, non-volatile data storage resources. One such data storage resource is a disk drive. A disc drive operates by writing user data to, and reading user data from, a disc-shaped magnetic medium that is organized into tracks. Each track forms an annulus bounded by an inner radius and an outer radius on the disk, where the center of the annulus is the axis of rotation of the disk. In addition to the user data within the tracks, positioning information, known in the art as "servo data," is typically written periodically among the user data within the tracks. Both the user data on the tracks and servo data between the tracks are magnetic markings written on the media by creating spatially varying magnetization patterns on the media. Read/write heads read data from and write data to the disc medium as the disc rotates about its axis of rotation. The servo data are used to guide the read/write heads to an appropriate position relative to the track being read from or written to.

Figure 1:
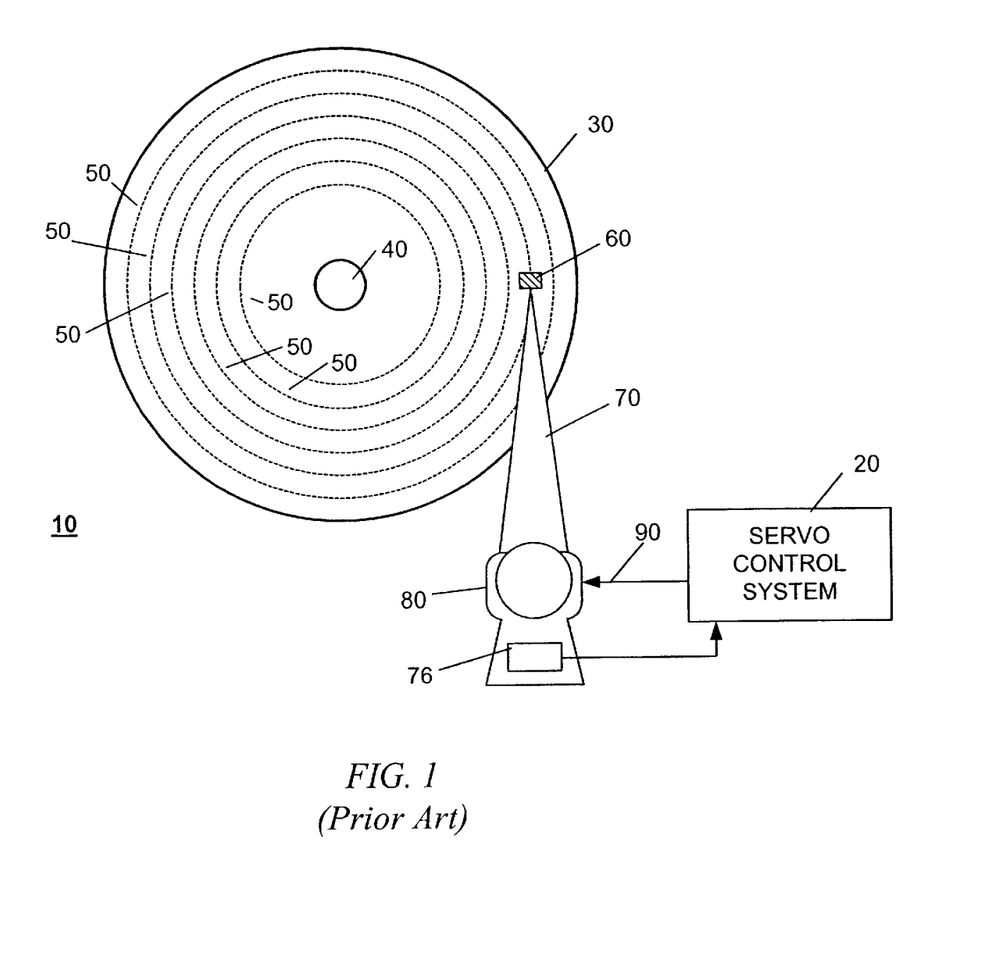
FIG. 1 shows a prior art head-disc assembly subsystem of a magnetic disc memory system with an associated servo control system.

FIG. 1 (Prior Art) shows a prior art head-disc assembly subsystem 10 of a magnetic disc memory system with an associated servo control system 20. A disc medium 30 attaches to a spindle motor 40, enabling rotation of the disc medium 30 about an axis of rotation. Multiple tracks 50 (centerlines only are shown) containing information data are written during a manufacturing process. A head 60 attached to a head arm assembly 70 is connected to a positioner assembly 80. The servo data from the disc medium 30 are read by head 60 and provided to the servo control system 20 after appropriate pre-amplification by pre-amplifier 76. The servo control system 20 analyzes the servo data and determines an appropriate correction, if necessary, to return the head to its optimum position over the track 50. The servo control system 20 communicates the head position correction to the positioner assembly 80 via an positioning signal 90. The positioner assembly 80 adjusts the position of the head 60 as a function of the positioning signal 90 from the servo control system 20.

Figure 2:
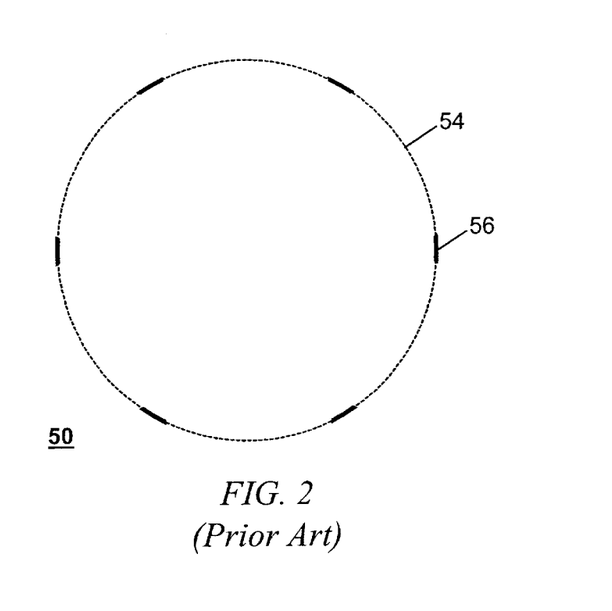
FIG. 2 shows a single track from the disc medium of FIG. 1.
Figure 3:
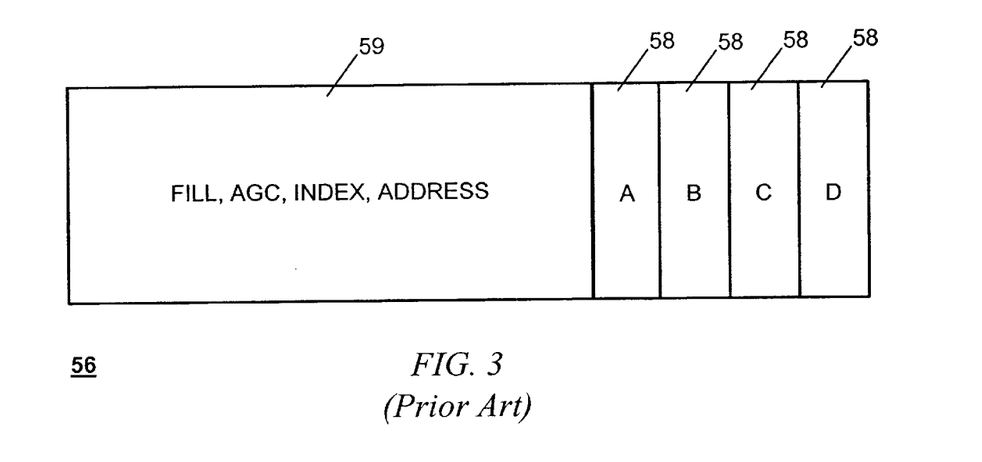
FIG. 3 illustrates how position information of FIG. 2 is further subdivided into a servo burst and multiple fields.

FIG. 2 (Prior Art) shows a single track 50 from the disc medium 30 of FIG. 1, subdivided into intervals of user information 54 and position information 56. FIG. 3 (Prior Art) illustrates how position information 56 of FIG. 2 is further subdivided into a servo burst 58 and multiple fields 59 that contain Fill, AGC, INDEX, and ADDRESS information. These later multiple fields 59 are beyond the scope of the present invention, and are therefore not described further.

Figure 4:
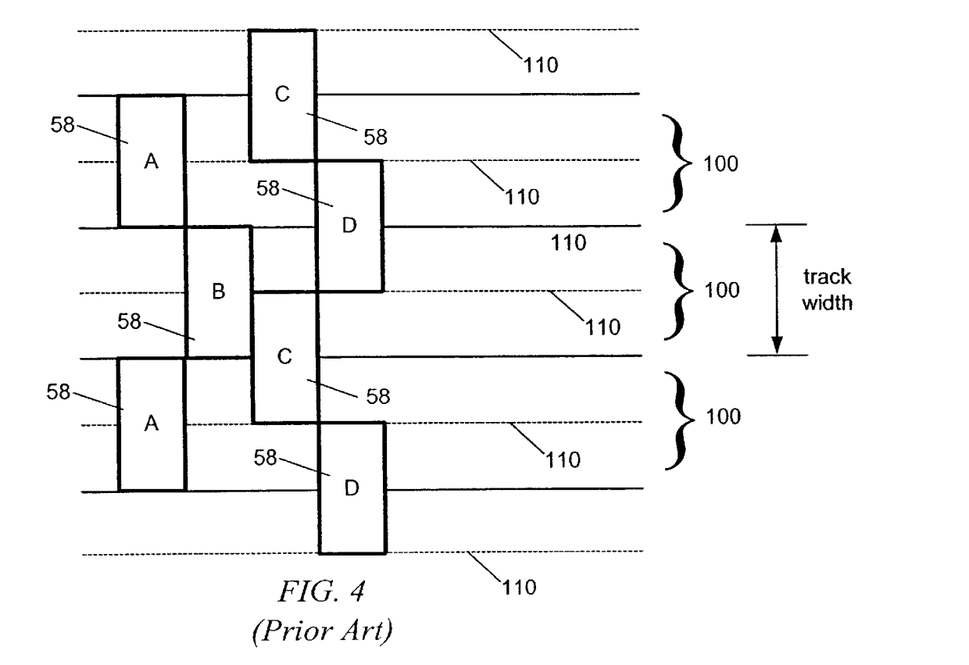
FIG. 4 shows a more detailed view of the servo bursts of FIG. 3.

FIG. 4 (Prior Art) shows a more detailed view of the servo bursts 58 of FIG. 3, positioned along several adjacent segments 100 of the tracks 50 on a typical magnetic disc medium 30. Because the segments 100 are very short arcs of the circular tracks 50, they are shown in FIG. 4 as straight, without curvature. FIG. 4 shows that each individual servo burst 58 is offset both perpendicularly from the center of tracks 110 as well as along the track with respect to the adjacent servo bursts. The purpose of this arrangement is described below.

Figure 5:
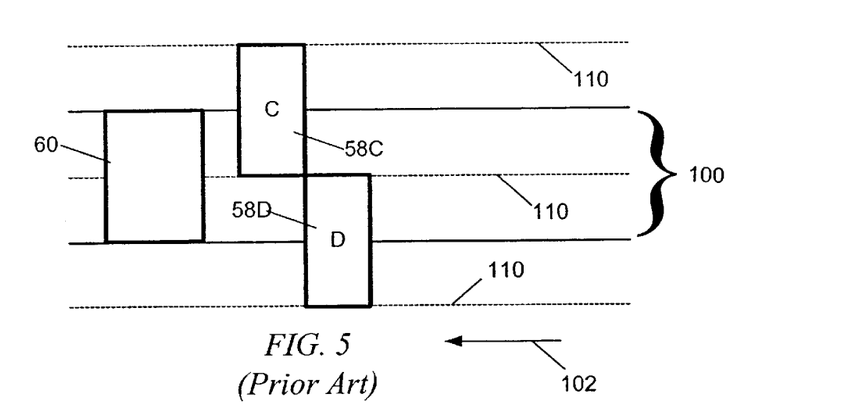
FIG. 5 illustrates a properly positioned read/write head from the subsystem of FIG. 1 reading servo bursts.

FIG. 5 (Prior Art) illustrates a read/write head 60 from the subsystem of FIG. 1, properly positioned directly over a track segment 100, about to encounter two servo bursts 58C and 58D. The disc medium 30 is spinning about an axis of rotation such that the track segment 100 is moving in the direction of the arrow 102, with respect to the head 60. The read/write head 60 is properly positioned over the track segment 100 when the head is situated symmetrically about the track center line 110 of the track segment 100, as shown.

Figure 6:
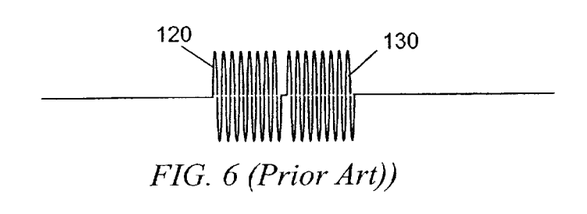
FIG. 6 illustrates electrical signals corresponding to servo bursts of FIG. 5 from a properly positioned head.

As the servo bursts 58 pass under the read/write head 60, the head 60 converts the spatially varying magnetic patterns on the medium 30 that form the bursts 58, into time varying electrical signals (also referred to herein as the "servo burst readback signal"). FIG. 6 (Prior Art) illustrates electrical signal 120 and 130, corresponding to servo bursts 58C and 58D, respectively, that the read/write head 60 produces as it passes the bursts 58C and 58D. Since the head 60 overlaps equal portions of bursts 58C and 58D, the amplitudes of the resulting signals 120 and 130 are substantially equal. The servo control system 20 interprets the equal amplitudes of electrical signals 120 and 130 to mean the head 60 is optimally positioned, and therefore no improvement is necessary.

Figure 7:
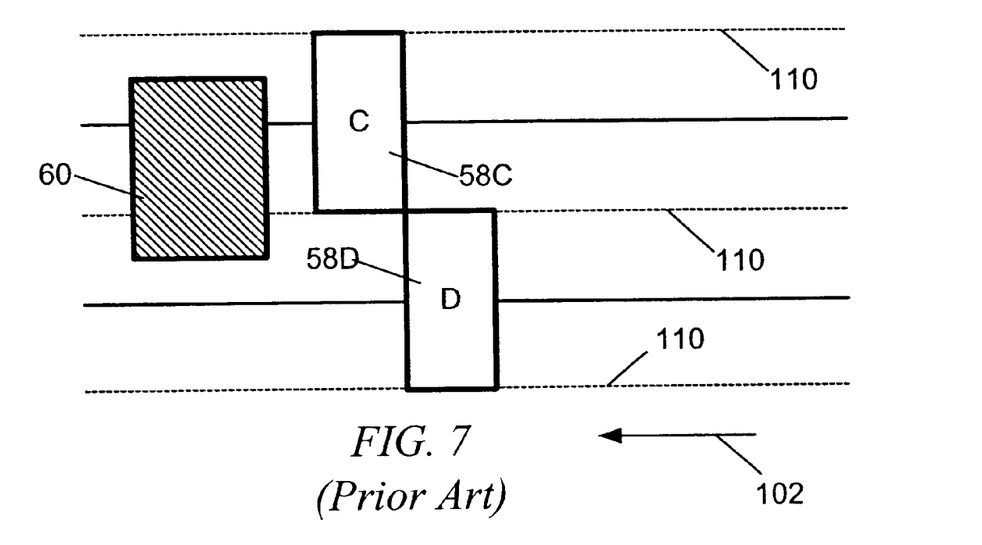
FIG. 7 illustrates an improperly positioned head from the subsystem of FIG. 1.
Figure 8:
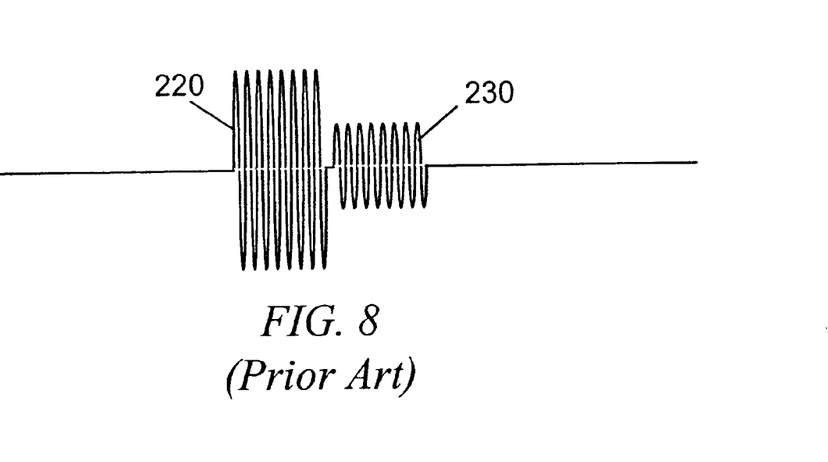
FIG. 8 illustrates electrical signals corresponding to servo bursts of FIG. 7 from an improperly positioned head.

FIG. 7 (Prior Art) illustrates an example of an improperly positioned head 60 from the subsystem 10 of FIG. 1, which is perpendicularly offset from the track centerline 110 of the track 100. Since the head 60 overlaps more of burst 58C than burst 58D, the amplitude of the electrical signal 220 is greater than the amplitude of the electrical signal 230, as shown in FIG. 8 (Prior Art). The servo control system 20 interprets the discrepancy between the electrical signals 220 and 230 to mean that the head 60 is not optimally positioned about the centerline. The servo control system 20 generates a positioning signal 90 as a function of amplitude differential between the two electrical signals 220 and 230, and which of the two signals is larger. The amplitude differential indicates how much correction the servo control system 20 should apply to the head 60, and which of the two is larger indicates which direction the servo control system 20 should move the head 60.

FIG. 4 shows that four rows of servo bursts should be used (58A, 58B, 58C and 58D) to detect a positioning error and generate a positioning signal 90 to compensate this error. Bursts 58C and 58D are used to keep the head on track (within an error of +/− one half of a track width), and bursts 58A and 58B are used to determine the direction to move the head 60 if the positioning error is greater than or equal to one half of a track width. Bursts must have substantial length (in the direction of track motion) to achieve an acceptable signal to noise ratio. Therefore a significant portion of the track must be dedicated to positioning information. The more that sectors of the disk 30 are used for servo information, the more important it is to reduce the size of bursts area in order to achieve best areal density in the magnetic recording.

FIG. 4 also shows that a substantial part of the disc area used for servo bursts area, nearly 50 percent, is not used at all. Large gaps between bursts in the direction perpendicular to the track centerline are necessary to avoid superposition of servo burst signals (i.e., crosstalk) from adjacent servo bursts. FIG. 4 thus shows that the prior art servo burst method suffers from significant area penalty. It is therefore desirable to realize a more efficient servo-burst method that will reduce the percentage of the track dedicated to servo bursts.

It is an object of the present invention to substantially overcome the above-identified disadvantages and drawbacks of the prior art.

SUMMARY OF THE INVENTION

The present invention provides a reduction in the percentage of the area dedicated to read/write head positioning information on a magnetic recording medium by employing servo bursts of different frequencies, thus allowing the servo bursts to be located adjacently in the direction perpendicular to the track center line (i.e., transverse to the center line). The servo burst readback signal corresponding to a particular servo burst on the disk medium is distinguished from the readback signal of an adjacent servo burst by analyzing the associated signal frequencies. Therefore, the invention requires little or no gap between servo bursts to prevent superposition of the readback signals from different bursts, as long as the adjacent bursts are of different frequencies. This allows writing bursts close to each other in the direction perpendicular to the track, so that crosstalk or even partial erasure of one burst by another is acceptable.

Specific layout of bursts and the associated frequency assignments may differ for different applications. In general, the prior art systems separate servo bursts in space on the disc media, which results in a separation in time when read by a head. This physical, spatial separation prevents superposition of the readback signal from different bursts. The present invention separates the servo bursts in frequency, so that spatial separation is unnecessary. The separation in frequency prevents superposition of the readback signal from different bursts.

The foregoing and other objects are achieved by the invention which in one aspect comprises a method of arranging a servo burst pattern for use in positioning a read/write head with respect to a track on a magnetic disc medium. The method includes disposing a first servo burst on the track, characterized by a first frequency, such that the first servo burst begins near a centerline associated with the track and extends in a first direction perpendicular to the centerline towards a first track edge. The method further includes disposing a second servo burst on the track, characterized by a second frequency, such that the second servo burst begins near the centerline and extends in a second direction perpendicular to the centerline towards a second track edge.

In another embodiment of the invention, the first servo burst extends beyond the first track edge to a centerline of a next adjacent track in the first direction. The second servo burst extends beyond the second track edge to a centerline of a next adjacent track in the second direction.

In another embodiment of the invention, the first servo burst is adjacent to the second servo burst, such that the first servo burst meets the second servo burst at the centerline.

Another embodiment of the invention further includes disposing a third servo burst on the track, characterized by the first frequency, such that the third servo burst is substantially centered on the centerline. The third servo burst is also offset from the first servo burst and the second servo burst in a direction parallel to the centerline.

In another embodiment of the invention, the third servo burst extends to the first track edge and to the second track edge.

In another embodiment of the invention, the third servo burst is adjacent to the first servo burst and to the second servo burst.

Another embodiment of the invention further includes disposing a fourth servo burst, characterized by the second frequency, on a next adjacent track in the first direction, and disposing a fifth servo burst, characterized by the second frequency, on a next adjacent track in the second direction.

In another embodiment of the invention, the fourth servo burst is centered on the next adjacent track in the first direction, and the fifth servo burst is centered on the next adjacent track in the second direction.

In another embodiment of the invention, the first servo burst includes a spatially varying magnetization pattern characterized by a first spatial frequency substantially equal to the first frequency. The second servo burst includes a spatially varying magnetization pattern characterized by a second spatial frequency substantially equal to the second frequency.

In another aspect, the invention comprises a servo burst pattern for use in positioning a read/write head with respect to a track on a magnetic disc medium. The burst pattern includes a first servo burst disposed on the track, characterized by a first frequency, such that the first servo burst begins near a centerline associated with the track and extends in a first direction perpendicular to the centerline towards a first track edge. The burst pattern also includes a second servo burst disposed on the track, characterized by a second frequency, such that the second servo burst begins near the centerline and extends in a second direction perpendicular to the centerline towards a second track edge.

In another embodiment of the invention, the first servo burst extends beyond the first track edge to a centerline of a next adjacent track in the first direction. The second servo burst extends beyond the second track edge to a centerline of a next adjacent track in the second direction.

In another embodiment of the invention, the first servo burst is adjacent to the second servo burst, such that the first servo burst meets the second servo burst at the centerline.

Another embodiment of the invention further includes a third servo burst, characterized by the first frequency, such that the third servo burst is substantially centered on the centerline. The third servo burst is also offset from the first servo burst and the second servo burst in a direction parallel to the centerline.

In another embodiment of the invention, the third servo burst extends to the first track edge and to the second track edge.

In another embodiment of the invention, the third servo burst is adjacent to the first servo burst and to the second servo burst.

Another embodiment of the invention further includes a fourth servo burst, characterized by the second frequency, on a next adjacent track in the first direction, and a fifth servo burst, characterized by the second frequency, on a next adjacent track in the second direction.

In another embodiment of the invention, the fourth servo burst is centered on the next adjacent track in the first direction, and the fifth servo burst is centered on the next adjacent track in the second direction.

In another embodiment of the invention, the first servo burst includes a spatially varying magnetization pattern characterized by a first spatial frequency substantially equal to the first frequency. The second servo burst includes a spatially varying magnetization pattern characterized by a second spatial frequency substantially equal to the second frequency.

In another aspect, the invention comprises a system for positioning a read/write head with respect to a track on a magnetic disc medium. The disc medium includes a servo burst pattern having a first servo burst disposed on the track, characterized by a first frequency, such that the first servo burst begins near a centerline associated with the track and extends in a first direction perpendicular to the centerline towards a first track edge. The servo burst pattern also includes a second servo burst disposed on the track, characterized by a second frequency, such that the second servo burst begins near the centerline and extends in a second direction perpendicular to the centerline towards a second track edge. The system includes a multi-frequency filter for receiving a composite readback signal from the read/write head and for separating the composite readback signal into a first readback signal and a second readback signal. The first readback signal corresponds to the first servo burst, and the second readback signal corresponds to the second servo burst. The system also includes an envelope detector for providing a first amplitude signal corresponding to an amplitude of the first readback signal, and for providing a second amplitude signal corresponding to an amplitude of the second readback signal. The system further includes a comparator for comparing the first amplitude signal to the second amplitude signal, and for providing an error signal corresponding to a difference between the first amplitude signal and the second amplitude signal. The system also includes a servo control system for receiving the error signal and generating a drive signal therefrom, and a positioner assembly, coupled to the read/write head, for adjusting the position of the read/write head with respect to the track, as a function of the drive signal.

Another embodiment of the invention further includes a band pass filter for receiving the readback signal from the read/write head, filtering an out-of-band noise component from the readback signal so as to produce a filtered readback signal, and providing the filtered readback signal to the multi-frequency filter.

In another embodiment of the invention, the multi-frequency filter includes a digital filter. The system further includes an analog to digital converter for receiving the readback signal from the read/write head, sampling the readback signal so as to produce a sequence of readback signal samples, and providing the readback signal samples to the digital filter.

Another embodiment of the invention further includes a servo gate generator for generating a servo gate. The servo gate is in an active state when the readback signal corresponding to one of the servo bursts is present, and in an inactive state when the readback signal corresponding to the servo bursts is absent.

In another embodiment of the invention, the multi-frequency filter receives the servo gate, and passes the first readback signal and the second readback signal when the servo gate is in the active state. The filter also blocks the first readback signal and the second readback signal when the servo gate is in the inactive state.

Another embodiment of the invention further includes a downconverter for receiving the readback signal, for shifting a frequency spectrum associated with the readback signal to a lower frequency range so as to provide a down-shifted readback signal, and for providing the down-shifted readback signal to the multi-frequency filter.

Another embodiment of the invention further includes an upconverter for receiving the readback signal, and for shifting the frequency spectrum associated with the readback signal to a higher frequency range so as to provide an up-shifted readback signal. The system also includes a downconverter for receiving the up-shifted readback signal, for shifting a frequency spectrum associated with the up-shifted readback signal to a lower frequency range so as to provide a down-shifted readback signal, and for providing the down-shifted readback signal to the multi-frequency filter.

In another aspect, the invention comprises a servo burst pattern for use in positioning a read/write head with respect to a plurality of concentric tracks on a magnetic disc medium, wherein each of the plurality of tracks is characterized by a centerline, an inside track edge and an outside track edge. The servo burst pattern includes a first set of servo bursts adjacently disposed on the tracks along a first axis perpendicular to the centerlines. Each of the first set of servo bursts is disposed on an individual track, from the inside track edge to the outside track edge. A frequency characteristic associated with each of the servo bursts alternates between a first frequency and a second frequency for consecutive servo bursts. The servo burst pattern also includes a second set of servo bursts adjacently disposed on the tracks along a second axis perpendicular to the centerlines and parallel to the first axis. Each of the second set of servo bursts is disposed on two adjacent tracks, from the centerline of one track to the centerline of a next adjacent track. A frequency characteristic associated with each of the second set of servo bursts alternates between the first frequency and the second frequency for consecutive servo bursts.

In another aspect, the invention comprises a system for positioning a read/write head with respect to a track on a magnetic disc medium. The disc medium includes a servo burst pattern having a first set of servo bursts adjacently disposed on the tracks along a first axis perpendicular to the centerlines. Each of the first set of servo bursts is disposed on an individual track, from the inside track edge to the outside track edge, and a frequency characteristic associated with each of the servo bursts alternates between a first frequency and a second frequency for consecutive servo bursts. The servo burst pattern also includes a second set of servo bursts adjacently disposed on the tracks along a second axis perpendicular to the centerlines and parallel to the first axis. Each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts. The system includes a multi-frequency filter for receiving a composite readback signal from the read/write head and for separating the composite readback signal into a first readback signal and a second readback signal. The first readback signal corresponds to servo bursts characterized by the first frequency and the second readback signal corresponds to servo bursts characterized by the second frequency. The system further includes an envelope detector for providing a first amplitude signal corresponding to an amplitude of the first readback signal, and for providing a second amplitude signal corresponding to an amplitude of the second readback signal. The system also includes a comparator for comparing the first amplitude signal to the second amplitude signal, and for providing an error signal corresponding to a difference between the first amplitude signal and the second amplitude signal. The system also includes a servo control system for receiving the error signal and generating a drive signal therefrom. The system also includes a positioner assembly, coupled to the read/write head, for adjusting the position of the read/write head with respect to the track, as a function of the drive signal.

In another aspect, the invention includes a method of positioning a read/write head with respect to a track on a magnetic disc medium. The disc medium includes a servo burst pattern having a first set of servo bursts adjacently disposed on the tracks along a first axis perpendicular to the centerlines. Each of the first set of servo bursts is disposed on an individual track, from the inside track edge to the outside track edge, and a frequency characteristic associated with each of the servo bursts alternates between a first frequency and a second frequency for consecutive servo bursts. The servo burst pattern also includes a second set of servo bursts adjacently disposed on the tracks along a second axis perpendicular to the centerlines and parallel to the first axis. Each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts. The method includes receiving a composite readback signal from the read/write head and separating the composite readback signal into a first readback signal and a second readback signal. The first readback signal corresponds to servo bursts characterized by the first frequency and a second readback signal corresponding to servo bursts characterized by the second frequency. The method also includes providing a first amplitude signal corresponding to an amplitude of the first readback signal, and providing a second amplitude signal corresponding to an amplitude of the second readback signal. The method further includes comparing the first amplitude signal to the second amplitude signal, and providing an error signal corresponding to a difference between the first amplitude signal and the second amplitude signal. The method also includes receiving the error signal and generating a drive signal therefrom, and adjusting the position of the read/write head with respect to the track, as a function of the drive signal.

In another aspect, the invention comprises method of positioning a read/write head with respect to a track on a magnetic disc medium, The disc medium includes a servo burst pattern having a first servo burst disposed on the track, characterized by a first frequency, such that the first servo burst begins near a centerline associated with the track and extends in a first direction perpendicular to the centerline towards a first track edge. The servo burst pattern also includes a second servo burst disposed on the track, characterized by a second frequency, such that the second servo burst begins near the centerline and extends in a second direction perpendicular to the centerline towards a second track edge. The method includes receiving a composite readback signal from the read/write head and separating the composite readback signal into a first readback signal and a second readback signal. The first readback signal corresponds to the first servo burst and the second readback signal corresponds to the second servo burst. The method also includes providing a first amplitude signal corresponding to an amplitude of the first readback signal, and providing a second amplitude signal corresponding to an amplitude of the second readback signal. The method further includes comparing the first amplitude signal to the second amplitude signal, and providing an error signal corresponding to a difference between the first amplitude signal and the second amplitude signal. The method also includes receiving the error signal and generating a drive signal therefrom, and adjusting the position of the read/write head with respect to the track, as a function of the drive signal.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 9:
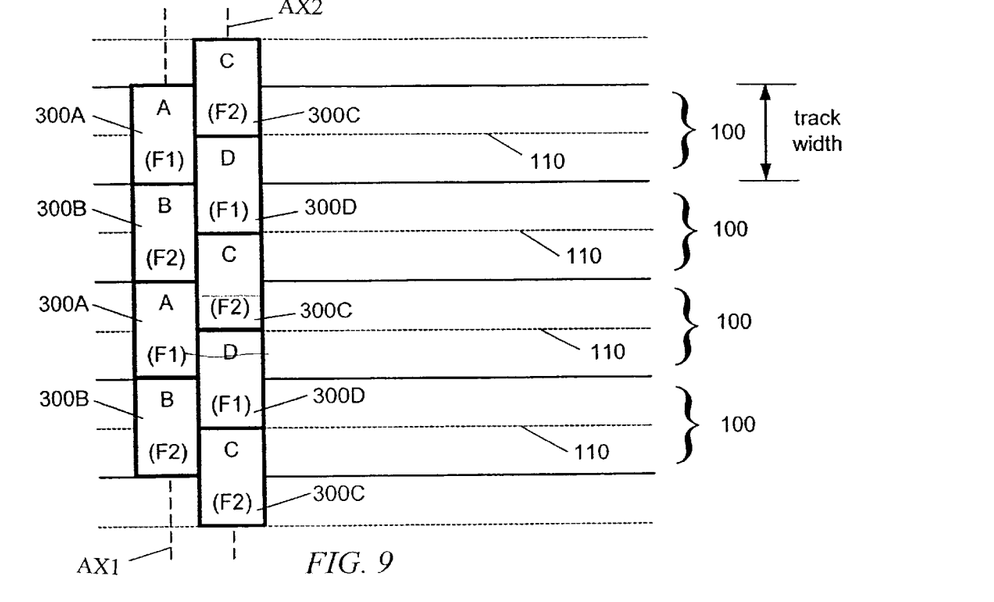
FIG. 9 illustrates an arrangement of multiple servo bursts according to a preferred embodiment of the present invention.

FIG. 9 illustrates an arrangement of multiple servo bursts 300 distributed among several adjacent track segments 100 from a disc medium 30 according to a preferred embodiment of the present invention. The track segments 100 shown in FIG. 9 are short arcs of a plurality of concentric tracks on the disc medium 30. Each of the concentric tracks is characterized by a centerline 110, an inside track edge and an outside track edge. Each of the servo bursts 300 is characterized by spatially varying magnetic patterns written into the disc medium 30. As the disc rotates about an axis of rotation, and the track segment 100 moves with respect to a read/write head, the head converts the spatially varying magnetization patterns into time varying electrical signals. The frequency of the time varying electrical signals is dependent upon the rate of disc rotation and the characteristics of the spatially varying magnetic patterns (i.e., the spatial frequency of the patterns). The magnetization patterns of the servo bursts 300 are arranged such that given a constant rate of disc rotation, the time-varying electrical signals derived from the servo bursts 300A and 300D have a frequency of F1, and the time-varying electrical signals derived from the servo bursts 300B and 300C have a frequency of F2. In this arrangement, each of the servo bursts 300A and 300B is disposed symmetrically about a track centerline, and are bounded by the track edges in a direction perpendicular to the track centerlines. Servo bursts 300A and 300B are disposed along an axis AX1 that extends in a direction perpendicular to the track centerlines. Each of the servo bursts 300C and 300D is disposed symmetrically about a track edge, and is bounded by adjacent track centerlines in a direction perpendicular to the centerlines. Servo bursts 300C and 300D are disposed along an axis AX2 that extends in a direction perpendicular to the centerlines. Also, the servo bursts 300C and 300D are spatially shifted with respect to servo bursts 300A and 300B in a direction parallel to the track centerlines.

Although the embodiment of FIG. 9 shows each of the servo bursts 200C extending from a centerline 110 to a next adjacent centerline 110, other embodiments may include servo bursts that are disposed only within a smaller portion of the region occupied by the servo bursts 300C and 300D of FIG. 9. For example, servo bursts 300C and 300D may both begin at a centerline, but may only extend part way to a track edge, rather than all the way to the next adjacent centerline. Likewise, other embodiments may include servo bursts 300A and 300B disposed within a smaller portion of the regions occupied by those servo bursts in FIG. 9.

Additionally, servo-burst patterns may be shifted in the transverse direction so that bursts 300C and 300D are "above" or "below" the respective track center lines. The corresponding bursts 300A and 300B may also be shifted in the transverse direction "above" or "below" a track edge, for example. Servo burst patterns yielding any number of frequencies, including multiple frequencies within a single burst pattern, may be employed and any number of layers may be employed in accordance with the principles of the present invention. For example, two layers are represented in FIG. 9, each by a vertical column of bursts centered on axis AX1 or AX2. Embodiments having a single such column (also referred to herein as a layer), three such columns, or any number of such columns are within the scope of the invention. A single-layer implementation may include bursts of four different frequencies in a regularly repeated pattern, such as F1, F2, F3, F4, F1, F2, F3, F4, . . . . F1, F2,F3,F4. Four corresponding filters in the servo read-write system may be employed to determine the relative strength of signal for each frequency and thereby determine where within any grouping of four servo-bursts the disk head is tracking. Other configurations may employ three, four, or more such layers.

Figure 10:
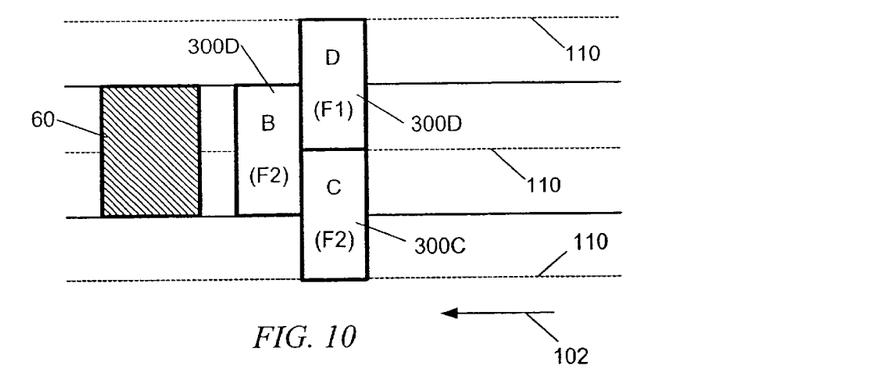
FIG. 10 shows a read/write head optimally positioned on the centerline of a track segment, along with several servo bursts.

FIG. 10 shows a read/write head 60 optimally positioned on the centerline 110 of a track segment 100, along with servo bursts 300B, 300C and 300D. As the track segment 100 passes under the head 60, the head 60 converts the magnetization patterns associated with the servo bursts into the time-varying readback signals 302, 304 and 306 shown in FIG. 11. Readback signal 302, characterized by a frequency F2, corresponds to servo burst 300B. Readback signal 304, characterized by a frequency F1, corresponds to servo burst 300D, and readback signal 306, characterized by a frequency F2, corresponds to servo burst 300C.

A servo control system 20 compares the amplitudes of readback signals 304 and 306, to determine whether a correction is necessary to return the head 60 to an optimum position. In the arrangement of FIG. 9, the head 60 is optimally positioned with respect to the track centerline 110, i.e., it is disposed symmetrically about the centerline 110 so as to substantially cover the entire track width. Since the head 60 overlaps equal portions of bursts 300C and 300D, the amplitudes of the resulting signals 306 and 304, respectively, are substantially equal. The servo control system interprets the equal amplitudes of electrical signals 306 and 304 to mean the head 60 is optimally positioned, and therefore no improvement is necessary. Since the servo burst 300B is disposed symmetrically about the centerline 110 of the track 100, the corresponding signal 302 has maximum amplitude when head 60 is in proper position as shown in FIG. 9, and falls off slowly as the head 60 moves in a direction transverse to the centerline 110. Therefore, the amplitude of servo burst 300B is not sensitive to small positioning errors and can't provide positioning feedback for the servo system. Thus, the servo control system uses servo bursts 300A and 300B to measure head positioning error in off-track operation, i.e., when the error is greater than 50 percent of the track width.

Comparing FIG. 4 of the prior art to FIG. 9 of the present invention shows that the servo bursts 300 of the present invention require significantly less magnetic media surface area than the prior art. The increase in efficiency is due to the fact that the servo bursts of the present invention are substantially adjacent, with no gaps required in the direction transverse to the centerline to prevent cross-talk.

Figure 12:
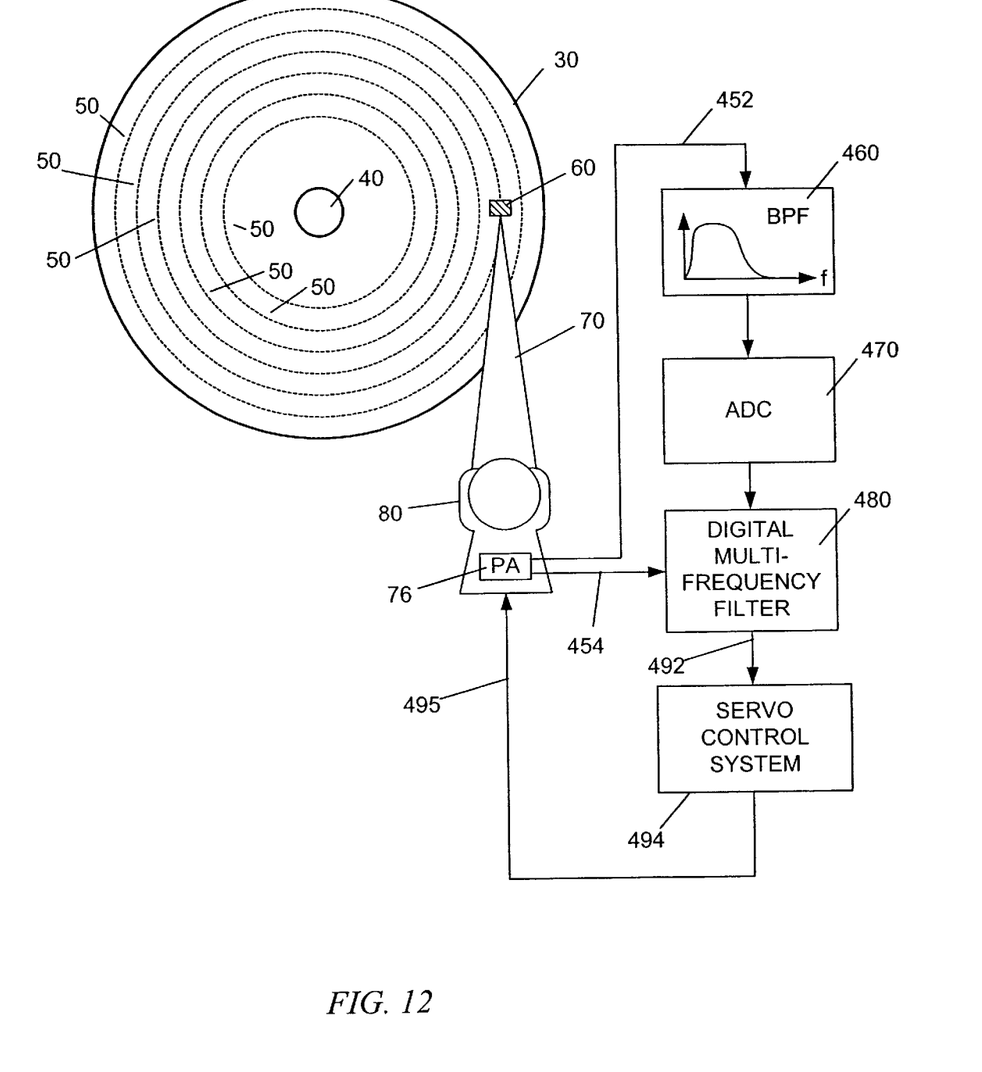
FIG. 12 illustrates one preferred embodiment of a magnetic disc read/write system according to the present invention; and, FIG. 12A illustrates an embodiment of the invention in which the digital multi-frequency filter in the magnetic disc read/write system includes first and second bandpass filters, first and second envelope detectors, and a comparator.

FIG. 12 illustrates one preferred embodiment of a magnetic disc read/write system according to the present invention. The analog readback signal 452 from the head preamplifier 76 passes through a band pass filter 460 to reduce or eliminate out-of-band noise. The analog to digital converter (ADC) 470 samples the readback signal 452 and provides the sampled signal to a digital multi-frequency filter 480. The filter 480 separates the readback signals (corresponding to the servo bursts) according to their associated frequency characteristics, and provides the separated signals to the servo control system 494. The servo control system 494 analyzes the separated signals from the filter 480 and produces an error signal 492 as a function of those separated signals as described herein. In one embodiment of the invention, the filter 480 separates the sampled signal into frequency bands corresponding to the main frequency components of the sampled signal, and measures the amplitudes of those main frequency components in the sampled signal. In other embodiments of the invention, the digital filter 480 may adaptively shift its passband response to match the servo burst frequencies currently in the readback signal 452. In these embodiments, the filter 480 alternately samples the servo bursts of different frequencies.

In general, the digital filter 480 provides an error signal 492 to the servo control system 494 that indicates the position of the head 60 with respect to the track centerline. The servo control system 494 then generates a drive signal 495 that stimulates the positioner assembly 80 to move the head 60 towards an optimal position with respect to the track centerline. In off-track operation (i.e., when the head has moved more than +/− one half of a track width from the optimal position), the servo control system 494 uses filtered readback signals from other servo bursts (in addition to the two bursts described above) to determine the proper direction and magnitude of the head position correction. Just as the invention uses 300C and 300D pairs of servo bursts to determine head corrections when the error is within +/− one half of a track width of the optimal position, the invention can also use 300A and 300B pairs to determine head corrections when the positioning error exceeds +/− one half of a track width of the optimal position.

Figure 12A:
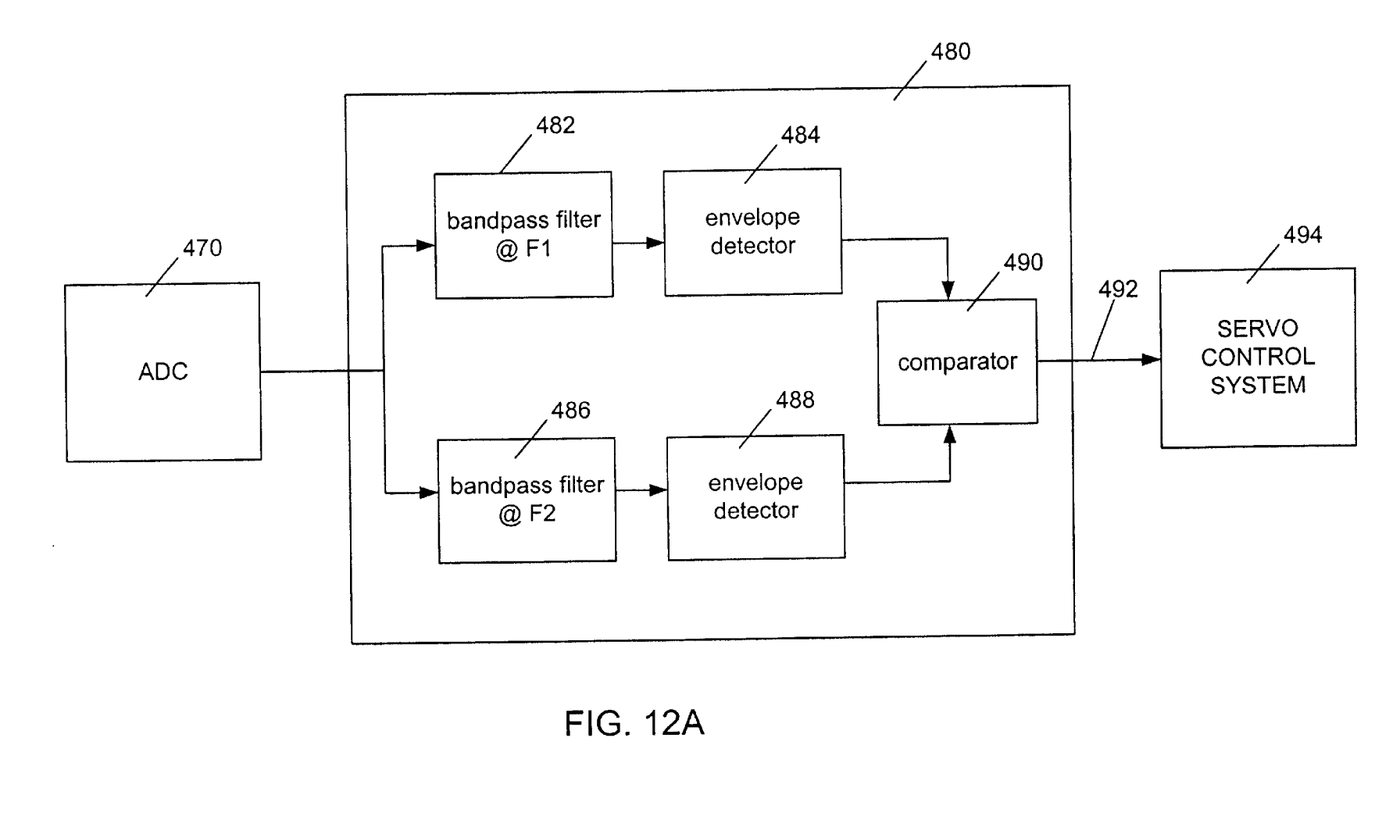

In one embodiment of the invention, the digital filter 480 includes a first bandpass filter 482, a first envelope detector 484, a second bandpass filter 486, a second envelope detector 488, and a comparator 490, as shown in FIG. 12A. The passband of the first bandpass filter 482 is centered at or near F1, and the passband of the second bandpass filter 486 is centered at or near F2. Both bandpass filters 482 and 486 receive the digital output signal from the ADC 470. The first envelope detector 484 receives the output signal from the first bandpass filter 482, and produces a signal (F1 signal) that corresponds to the amplitude of the output of the bandpass filter 482. The second envelope detector 488 receives the output signal from the second bandpass filter 486 and produces a signal (F2 signal) that corresponds to the amplitude of the output signal from the second bandpass filter 486. The comparator 490 receives the output signals from the first envelope detector 484 and the second envelope detector 488, and produces an error signal 492 corresponding to the relative amplitude of the two signals. In one embodiment, the value of the error signal 492 from the comparator 490 (i) is negative when the F1 signal is greater than the F2 signal, (ii) is positive when the F2 signal is greater than the F1 signal, and (iii) is substantially zero when the F1 signal equals the F2 signal. In alternate embodiments, other values of the error signal 492 may be used to indicate the relationship between the F1 and F2 signals, and to indicate to the servo control system how the head position should be modified. In other embodiments, the function described herein for the digital filter 480 may be implemented in the analog domain, prior to the ADC 470.

Figure 11:
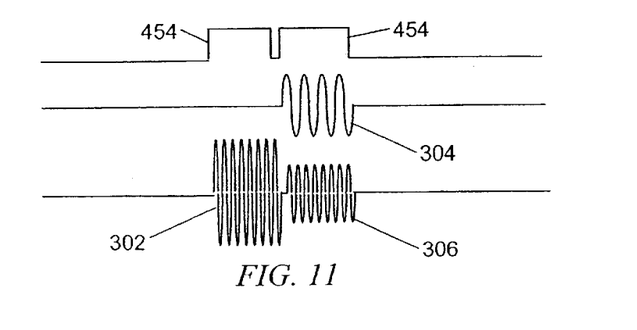
FIG. 11 shows the readback signals from the read/write head corresponding to the servo bursts of FIG. 10.

Some embodiments of the digital filter 480 include a gating function, such that the filter 480 only passes signals when servo gate signal 454 is in an active state (e.g., logic high), and blocks signals when the servo gate signal 454 is in an inactive state (e.g., logic low). The preamplifier 76 provides the servo gate signal 454, which delineates the time separation between the rows of servo bursts 300A, 300B and 300C, and 300D. An example of the servo gate signal is shown in FIG. 11 for the two rows of servo bursts shown. Note that the servo gate signal 454 is active (i.e., high) only when the readback signals 302, 304 and 306 are present.

In operation, the head 60 in this embodiment occasionally encounters a servo burst pattern as shown in FIG. 10 as the disc medium 30 rotates. As the head encounters the servo bursts 300C and 300D that are offset from the track centerline 110, the head produces readback signals 306 and 304, respectively. After the signals pass through the bandpass filter 460 and are sampled by the ADC 470, the digital filter 480 separates the signals according to their respective frequency bands, and generates an error signal 492 corresponding to the relative amplitudes of the signals. The filter 480 provides the error signal 492 to the servo control system 494, which generates a drive signal 495 as a function of the error signal 492 and provides the drive signal 495 to the positioner assembly 80. Preferably, the drive signal 495 causes the positioner assembly 80 to move the head in a direction that minimizes the error signal, i.e., that causes the amplitudes of the readback signals 306 and 306 to be substantially equal.

Figure 13:
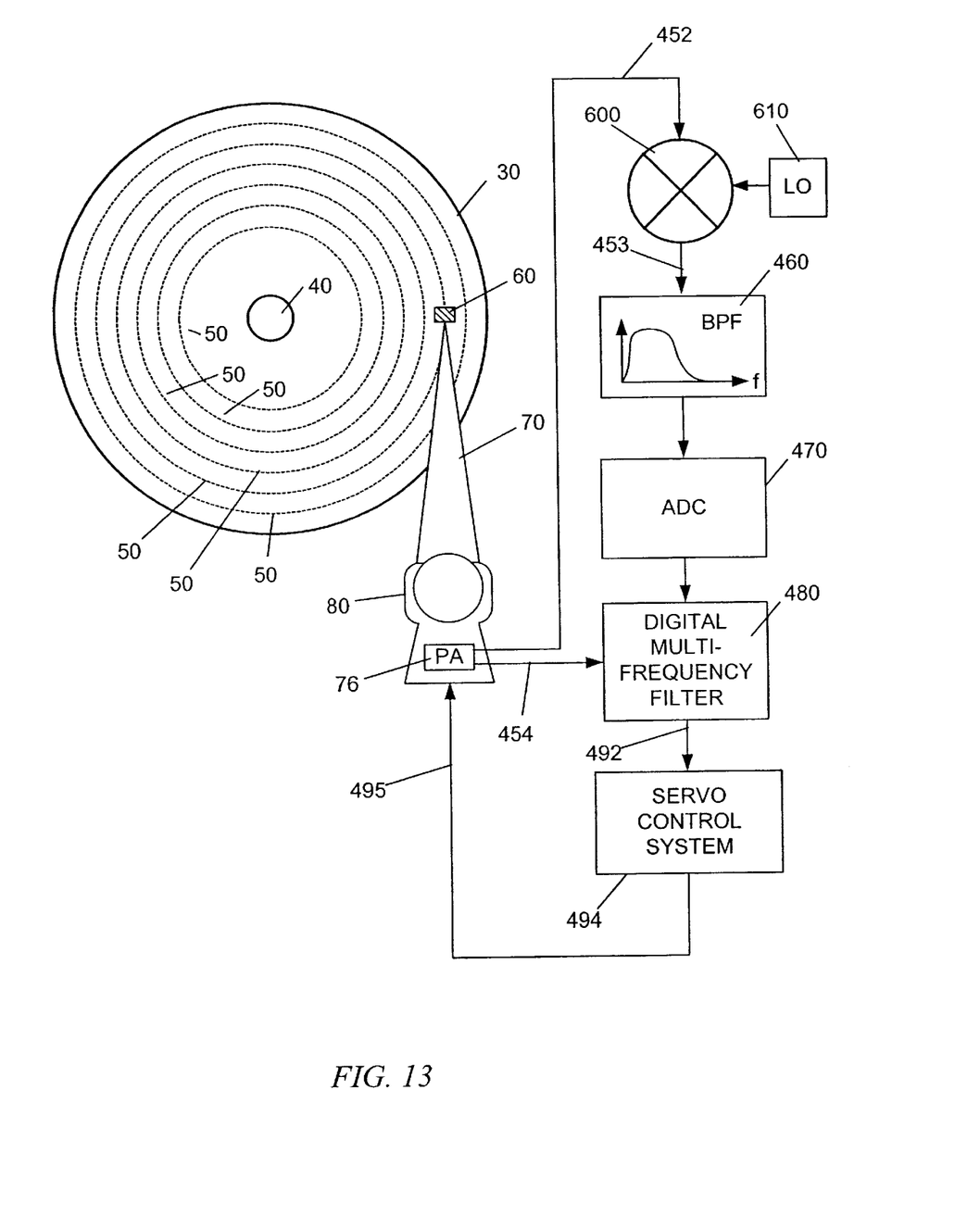
FIG. 13 illustrates another embodiment of the invention shown in FIG. 12.

FIG. 13 illustrates another embodiment of the invention, which is similar to the one shown in FIG. 12, but further includes downconverter 600 driven by a local oscillator (LO) 610. Preferably the LO 610 is programmable oscillator, but other devices known in the art for providing a reference signal may also be used. The downconverter 600 is used when the disc medium 30 includes high frequency servo signals (i.e., greater than or equal to 200 MHz). A typical ADC cannot directly sample such high frequency signals, so the downconverter 600 shifts the frequency spectrum of the corresponding readback signal to a more suitable frequency range, such as 10–20 MHz. In one embodiment, the frequency of reference signal from the LO 610 varies according to the frequency components within the readback signal 452, so that the frequency of the down converter output signal 453 remains substantially constant. Maintaining a substantially constant output signal 453 means that the passband of the digital filter 480 can remain constant, i.e., the passband of the filter 480 does not need to follow the frequency shifts of the servo bursts. Such a filter 480 will be significantly less complex than a filter that must shift its pass band to follow the frequencies in the incoming signal. In some embodiments, the downconverter 600 may consist of an upconverter 615 followed by a downconverter 620, as shown in FIG. 13A, to avoid aliasing of unrelated harmonics.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of arranging a servo burst pattern for use in positioning a read/write head with respect to a track by comparing the respective amplitudes of the readback signals of a plurality of servo bursts, wherein said track may be characterized by a centerline on a magnetic disc medium, comprising:
    disposing on the track a first servo burst, characterized by a first frequency, such that the first servo burst begins substantially along a line in the same direction as the centerline associated with the track and extends along an axis in a first direction transverse to the centerline; and,
    disposing on the track a second servo burst, characterized by a second frequency different from the first frequency, such that the second servo burst begins substantially along said line in the same direction as the centerline associated with the track and extends along said axis in a second direction transverse to the centerline.

2. A method according to claim 1, wherein the first servo burst extends beyond the first track edge to points near a centerline of a next adjacent track in the first direction, and the second servo burst extends beyond the second track edge to points near a centerline of a next adjacent track in the second direction.

3. A method according to claim 1, wherein the first servo burst is adjacent to the second servo burst, such that the first servo burst substantially meets the second servo burst at points near the centerline.

4. A method according to claim 1, further including disposing on the track a third servo burst, characterized by the first frequency, such that the third servo burst is substantially centered on the centerline, and offset from the first servo burst and the second servo burst in a direction parallel to the centerline.

5. A method according to claim 4, wherein the third servo burst substantially extends to the first track edge and to the second track edge.

6. A method according to claim 4, wherein the third servo burst is adjacent to the first servo burst and to the second servo burst.

7. A method according to claim 1, further including disposing a fourth servo burst, characterized by the second frequency, on a next adjacent track in the first direction, and disposing a fifth servo burst, characterized by the second frequency, on a next adjacent track in the second direction.

8. A method according to claim 7, wherein the fourth servo burst is substantially centered on the next adjacent track in the first direction, and the fifth servo burst is substantially centered on the next adjacent track in the second direction.

9. A method according to claim 1, wherein the first servo burst includes a spatially varying magnetization pattern characterized by a first spatial frequency substantially equal to the first frequency, and the second servo burst includes a spatially varying magnetization pattern characterized by a second spatial frequency substantially equal to the second frequency.

10. A magnetic disc medium including a servo burst pattern for use in positioning a read/write head with respect to a track on a magnetic disc medium by comparing the respective amplitudes of the readback signals of a plurality of servo bursts, wherein said track may be characterized by a centerline, said magnetic disc medium comprising:

a first servo burst disposed on the track, characterized by a first frequency, such that the first servo burst begins substantially along a line in the same direction as the centerline associated with the track and extends along an axis in a first direction transverse to the centerline; and, a second servo burst disposed on the track, characterized by a second frequency different from said first frequency, such that the second servo burst begins substantially along said line in the same direction as the centerline associated with the track and extends along said axis in a second direction transverse to the centerline.

11. A magnetic disc medium according to claim 10, wherein the first servo burst extends beyond the first track edge to a centerline of a next adjacent track in the first direction, and the second servo burst extends beyond the second track edge to a centerline of a next adjacent track in the second direction.

12. A magnetic disc medium according to claim 10, wherein the first servo burst is adjacent to the second servo burst, such that the first servo burst meets the second servo burst at the centerline.

13. A magnetic disc medium according to claim 10, further including a third servo burst, characterized by the first frequency, such that the third servo burst is substantially centered on the centerline, and offset from the first servo burst and the second servo burst in a direction parallel to the centerline.

14. A magnetic disc medium according to claim 13, wherein the third servo burst extends to the first track edge and to the second track edge.

15. A magnetic disc medium according to claim 13, wherein the third servo burst is adjacent to the first servo burst and to the second servo burst.

16. A magnetic disc medium according to claim 10, further including a fourth servo burst, characterized by the second frequency, on a next adjacent track in the first direction, and a fifth servo burst, characterized by the second frequency, on a next adjacent track in the second direction.

17. A magnetic disc medium according to claim 16, wherein the fourth servo burst is centered on the next adjacent track in the first direction, and the fifth servo burst is centered on the next adjacent track in the second direction.

18. A magnetic disc medium according to claim 10, wherein the first servo burst includes a spatially varying magnetization pattern characterized by a first spatial frequency substantially equal to the first frequency, and the second servo burst includes a spatially varying magnetization pattern characterized by a second spatial frequency substantially equal to the second frequency.

19. A system for positioning a read/write head with respect to a track on a magnetic disc medium, wherein the disc medium includes a servo burst pattern having (i) a first servo burst disposed on the track, characterized by a first frequency, and (ii) a second servo burst disposed on the track, characterized by a second frequency, said magnetic disc medium comprising:

a multi-frequency filter for receiving a composite readback signal from the read/write head and for separating the composite readback signal into a first readback signal corresponding to the first servo burst and a second readback signal corresponding to the second servo burst;

an envelope detector for providing a first amplitude signal corresponding to an amplitude of the first readback signal, and for providing a second amplitude signal corresponding to an amplitude of the second readback signal;

a comparator for comparing the first amplitude signal to the second amplitude signal, and for providing an error signal corresponding to a difference between the first amplitude signal and the second amplitude signal;

a servo control system for receiving the error signal and generating a drive signal therefrom; and, a positioner assembly, coupled to the read/write head, for adjusting the position of the read/write head with respect to the track, as a function of the drive signal.

20. A system according to claim 19, further including a band pass filter for receiving the readback signal from the read/write head, filtering an out-of-band noise component from the readback signal so as to produce a filtered readback signal, and providing the filtered readback signal to the multi-frequency filter.

21. A system according to claim 19, wherein the multi-frequency filter includes a digital filter, and further including an analog to digital converter for receiving the readback signal from the read/write head, sampling the readback signal so as to produce a sequence of readback signal samples, and providing the readback signal samples to the digital filter.

22. A system according to claim 19, further including a servo gate generator for generating a servo gate, wherein the servo gate is in an active state when the readback signal corresponding to one of the servo bursts is present, and in an inactive state when the readback signal corresponding to the servo bursts is absent.

23. A system according to claim 22, wherein the multi-frequency filter receives the servo gate, and passes the first readback signal and the second readback signal when the servo gate is in the active state, and blocks the first readback signal and the second readback signal when the servo gate is in the inactive state.

24. A system according to claim 19, further including a downconverter for receiving the readback signal, for shifting a frequency spectrum associated with the readback signal to a lower frequency range so as to provide a down-shifted readback signal, and for providing the down-shifted readback signal to the multi-frequency filter.

25. A system according to claim 19, further including:
an upconverter for receiving the readback signal, and for shifting the frequency spectrum associated with the readback signal to a higher frequency range so as to provide an up-shifted readback signal; and,
a downconverter for receiving the up-shifted readback signal, for shifting a frequency spectrum associated with the up-shifted readback signal to a lower frequency range so as to provide a down-shifted readback signal, and for providing the down-shifted readback signal to the multi-frequency filter.

26. A magnetic disc medium for use in positioning a read/write head with respect to a plurality of concentric tracks on a magnetic disc medium by comparing the respective amplitudes of the readback signals of plurality of servo bursts, wherein each of the plurality of tracks is characterized by a centerline, an inside track edge and an outside track edge, said magnetic disc medium comprising:
a first set of servo bursts adjacently disposed on the tracks along a first axis perpendicular to the centerlines, wherein each of the first set of servo bursts is disposed on an individual track, from the inside track edge to the outside track edge, and a frequency characteristic associated with each of the servo bursts alternates between a first frequency and a second frequency different from said first frequency, for consecutive servo bursts;
a second set of servo bursts adjacently disposed on the tracks along a second axis perpendicular to the centerlines and parallel to the first axis, wherein each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts.

27. A magnetic disc medium according to claim 26, wherein the frequency characteristic associated with each of the plurality of servo bursts includes a spatially varying magnetization pattern characterized by a spatial frequency substantially equal to the frequency characteristic.

28. A system for positioning a read/write head with respect to a track on a magnetic disc medium, wherein the disc medium includes a servo burst pattern having (i) a first set of servo bursts adjacently disposed on the tracks along a first axis perpendicular to the centerlines, wherein each of the first set of servo bursts is disposed on an individual track, from the inside track edge to the outside track edge, and a frequency characteristic associated with each of the servo bursts alternates between a first frequency and a second frequency for consecutive servo bursts, and (ii) a second set of servo bursts adjacently disposed on the tracks along a second axis perpendicular to the centerlines and parallel to the first axis, wherein each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts, said magnetic disc medium comprising:
a multi-frequency filter for receiving a composite readback signal from the read/write head and for separating the composite readback signal into a first readback signal corresponding to servo bursts characterized by the first frequency and a second readback signal corresponding to servo bursts characterized by the second frequency;
an envelope detector for providing a first amplitude signal corresponding to an amplitude of the first readback signal, and for providing a second amplitude signal corresponding to an amplitude of the second readback signal;
a comparator for comparing the first amplitude signal to the second amplitude signal, and for providing an error signal corresponding to a difference between the first amplitude signal and the second amplitude signal;
a servo control system for receiving the error signal and generating a drive signal therefrom; and,
a positioner assembly, coupled to the read/write head, for adjusting the position of the read/write head with respect to the track, as a function of the drive signal.

29. A system according to claim 28, further including a band pass filter for receiving the readback signal from the read/write head, filtering an out-of-band noise component from the readback signal so as to produce a filtered readback signal, and providing the filtered readback signal to the multi-frequency filter.

30. A system according to claim 28, wherein the multi-frequency filter includes a digital filter, and further including an analog to digital converter for receiving the readback signal from the read/write head, sampling the readback signal so as to produce a sequence of readback signal samples, and providing the readback signal samples to the digital filter.

31. A system according to claim 28, further including a servo gate generator for generating a servo gate, wherein the servo gate is in an active state when the readback signal corresponding to one of the servo bursts is present, and in an inactive state when the readback signal corresponding to the servo bursts is absent.

32. A system according to claim 31, wherein the multi-frequency filter receives the servo gate, and passes the first readback signal and the second readback signal when the servo gate is in the active state, and blocks the first readback signal and the second readback signal when the servo gate is in the inactive state.

33. A system according to claim 28, further including a downconverter for receiving the readback signal, for shifting a frequency spectrum associated with the readback signal to a lower frequency range so as to provide a down-shifted readback signal, and for providing the down-shifted readback signal to the multi-frequency filter.

34. A system according to claim 28, further including:
an upconverter for receiving the readback signal, and for shifting the frequency spectrum associated with the readback signal to a higher frequency range so as to provide an up-shifted readback signal; and,
a downconverter for receiving the up-shifted readback signal, for shifting a frequency spectrum associated with the up-shifted readback signal to a lower frequency range so as to provide a down-shifted readback signal, and for providing the down-shifted readback signal to the multi-frequency filter.

35. A system for positioning a read/write head with respect to a track on a magnetic disc medium, wherein the disc medium includes a servo burst pattern having (i) a first set of servo bursts adjacently disposed on the tracks along a first axis perpendicular to the centerlines, wherein each of the first set of servo bursts is disposed on an individual track, from the inside track edge to the outside track edge, and a frequency characteristic associated with each of the servo bursts alternates between a first frequency and a second frequency for consecutive servo bursts, and (ii) a second set of servo bursts adjacently disposed on the tracks along a second axis perpendicular to the centerlines and parallel to the first axis, wherein each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts, comprising:

filtering means for receiving a composite readback signal from the read/write head and for separating the composite readback signal into a first readback signal corresponding to servo bursts characterized by the first frequency and a second readback signal corresponding to servo bursts characterized by the second frequency;

detection means for providing a first amplitude signal corresponding to an amplitude of the first readback signal, and for providing a second amplitude signal corresponding to an amplitude of the second readback signal;

comparison means for comparing the first amplitude signal to the second amplitude signal, and for providing an error signal corresponding to a difference between the first amplitude signal and the second amplitude signal;

control means for receiving the error signal and generating a drive signal therefrom; and, positioning means, coupled to the read/write head, for adjusting the position of the read/write head with respect to the track, as a function of the drive signal.

36. A system for positioning a read/write head with respect to a track on a magnetic disc medium, wherein the disc medium includes a servo burst pattern having (i) a first set of servo bursts adjacently disposed on the tracks along a first axis perpendicular to the centerlines, wherein each of the first set of servo bursts is disposed on an individual track, from the inside track edge to the outside track edge, and a frequency characteristic associated with each of the servo bursts alternates between a first frequency and a second frequency for consecutive servo bursts, and (ii) a second set of servo bursts adjacently disposed on the tracks along a second axis perpendicular to the centerlines and parallel to the first axis, wherein each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts, comprising:

an upconverter for receiving the readback signal, and for shifting the frequency spectrum associated with the readback signal to a higher frequency range so as to provide an up-shifted readback signal;

a downconverter for receiving the up-shifted readback signal, for shifting a frequency spectrum associated with the up-shifted readback signal to a lower frequency range so as to provide a down-shifted readback signal;

a multi-frequency filter for receiving the down-shifted readback signal from the downconverter and for separating the composite readback signal into a first readback signal corresponding to servo bursts characterized by the first frequency and a second readback signal corresponding to servo bursts characterized by the second frequency;

an envelope detector for providing a first amplitude signal corresponding to an amplitude of the first readback signal, and for providing a second amplitude signal corresponding to an amplitude of the second readback signal;

a comparator for comparing the first amplitude signal to the second amplitude signal, and for providing an error signal corresponding to a difference between the first amplitude signal and the second amplitude signal;

a servo control system for receiving the error signal and generating a drive signal therefrom; and, a positioner assembly, coupled to the read/write head, for adjusting the position of the read/write head with respect to the track, as a function of the drive signal.

37. A method of positioning a read/write head with respect to a track on a magnetic disc medium, wherein the disc medium includes a servo burst pattern having (i) a first set of servo bursts adjacently disposed on the tracks along a first axis perpendicular to the centerlines, wherein each of the first set of servo bursts is disposed on an individual track, from the inside track edge to the outside track edge, and a frequency characteristic associated with each of the servo bursts alternates between a first frequency and a second frequency for consecutive servo bursts, and (ii) a second set of servo bursts adjacently disposed on the tracks along a second axis perpendicular to the centerlines and parallel to the first axis, wherein each of the second set of servo bursts is disposed on two adjacent tracks, from the centerline of one track to the centerline of a next adjacent track, and a frequency characteristic associated with each of the second set of servo bursts alternates between the first frequency and the second frequency for consecutive servo bursts, comprising:

receiving a composite readback signal from the read/write head and separating the composite readback signal into a first readback signal corresponding to servo bursts characterized by the first frequency and a second readback signal corresponding to servo bursts characterized by the second frequency;

providing a first amplitude signal corresponding to an amplitude of the first readback signal, and providing a second amplitude signal corresponding to an amplitude of the second readback signal;

comparing the first amplitude signal to the second amplitude signal, and for providing an error signal corresponding to a difference between the first amplitude signal and the second amplitude signal;

receiving the error signal and generating a drive signal therefrom; and, adjusting the position of the read/write head with respect to the track, as a function of the drive signal.

38. A system for positioning a read/write head with respect to a track on a magnetic disc medium, wherein the disc medium includes a servo burst pattern having (i) a first servo burst disposed on the track, characterized by a first frequency, such that the first servo burst begins near a centerline associated with the track and extends in a first direction perpendicular to the centerline towards a first track edge, and (ii) a second servo burst disposed on the track, characterized by a second frequency, such that the second servo burst begins near the centerline and extends in a second direction perpendicular to the centerline towards a second track edge, comprising:

filter means for receiving a composite readback signal from the read/write head and for separating the composite readback signal into a first readback signal corresponding to the first servo burst and a second readback signal corresponding to the second servo burst;

detection means for providing a first amplitude signal corresponding to an amplitude of the first readback signal, and for providing a second amplitude signal corresponding to an amplitude of the second readback signal;

comparison means for comparing the first amplitude signal to the second amplitude signal, and for providing an error signal corresponding to a difference between the first amplitude signal and the second amplitude signal;

control means for receiving the error signal and generating a drive signal; and,     positioning means, coupled to the read/write head, for adjusting the position of the read/write head with respect to the track, as a function of the drive signal.

39. A system for positioning a read/write head with respect to a track on a magnetic disc medium, wherein the disc medium includes a servo burst pattern having (i) a first servo burst disposed on the track, characterized by a first frequency, such that the first servo burst begins near a centerline associated with the track and extends in a first direction perpendicular to the centerline towards a first track edge, and (ii) a second servo burst disposed on the track, characterized by a second frequency, such that the second servo burst begins near the centerline and extends in a second direction perpendicular to the centerline towards a second track edge, comprising:

an upconverter for receiving the readback signal, and for shifting the frequency spectrum associated with the readback signal to a higher frequency range so as to provide an up-shifted readback signal;

a downconverter for receiving the up-shifted readback signal, for shifting a frequency spectrum associated with the up-shifted readback signal to a lower frequency range so as to provide a down-shifted readback signal;

a multi-frequency filter for receiving the down-shifted readback signal from the downconverter and for separating the composite readback signal into a first readback signal corresponding to the first servo burst and a second readback signal corresponding to the second servo burst;

an envelope detector for providing a first amplitude signal corresponding to an amplitude of the first readback signal, and for providing a second amplitude signal corresponding to an amplitude of the second readback signal;

a comparator for comparing the first amplitude signal to the second amplitude signal, and for providing an error signal corresponding to a difference between the first amplitude signal and the second amplitude signal;

a servo control system for receiving the error signal and generating a drive signal; and,     a positioner assembly, coupled to the read/write head, for adjusting the position of the read/write head with respect to the track, as a function of the drive signal.

40. A method of positioning a read/write head with respect to a track on a magnetic disc medium, wherein the disc medium includes a servo burst pattern having (i) a first servo burst disposed on the track, characterized by a first frequency, such that the first servo burst begins near a centerline associated with the track and extends in a first direction perpendicular to the centerline towards a first track edge, and (ii) a second servo burst disposed on the track, characterized by a second frequency, such that the second servo burst begins near the centerline and extends in a second direction perpendicular to the centerline towards a second track edge, comprising:

receiving a composite readback signal from the read/write head and separating the composite readback signal into a first readback signal corresponding to the first servo burst and a second readback signal corresponding to the second servo burst;

providing a first amplitude signal corresponding to an amplitude of the first readback signal, and providing a second amplitude signal corresponding to an amplitude of the second readback signal;

comparing the first amplitude signal to the second amplitude signal, and for providing an error signal corresponding to a difference between the first amplitude signal and the second amplitude signal;

receiving the error signal and generating a drive signal therefrom; and,     adjusting the position of the read/write head with respect to the track, as a function of the drive signal.

41. A method of arranging a servo burst pattern for use in positioning a read/write head with respect to a track on a magnetic disc medium by comparing the respective amplitudes of the readback signals of a plurality of servo bursts, comprising:

disposing on a track having a centerline a first servo burst, characterized by a first frequency, such that the first servo burst extends along an axis in a first direction transverse to the centerline;

disposing on the track a second servo burst, characterized by a second frequency different from said first frequency, such that the second servo burst extends along said axis in a second direction transverse to the centerline; and     disposing on the track or on an adjacent track a third servo burst, characterized by a third frequency different from said first frequency and said second frequency, such that the third servo burst extends in a direction transverse to the centerline.

42. A method according to claim 41, further comprising disposing on the track or an adjacent track a fourth servo burst, characterized by a fourth frequency, such that the fourth servo burst extends in a direction transverse to the centerline.

43. A method according to claim 41 wherein bursts are arranged in a single layer.

44. A method according to claim 41 wherein the bursts are arranged in a plurality of layers.

* * * * *